United States Patent [19]
Turner

[11] Patent Number: 5,624,620
[45] Date of Patent: Apr. 29, 1997

[54] PROCESS FOR MAKING NON-EXTRUDED MOLDED BOARDS AND SHEET PRODUCTS

[76] Inventor: James E. Turner, 4339 Walnut Hill La., Dallas, Tex. 75229

[21] Appl. No.: 434,644

[22] Filed: May 3, 1995

[51] Int. Cl.$^6$ ................................................ B29C 43/34
[52] U.S. Cl. .................. 264/115; 264/109; 264/118; 264/DIG. 69; 425/140; 425/144; 425/202
[58] Field of Search ..................... 264/40.4, 40.6, 264/115, 118, DIG. 69, 109; 425/140, 144, 202, 209, 301, 412, 422, DIG. 46

[56] References Cited

U.S. PATENT DOCUMENTS

| | | | |
|---|---|---|---|
| 4,863,366 | 9/1989 | Kim | 425/376.1 |
| 5,088,910 | 2/1992 | Goforth et al. | 425/142 |
| 5,114,331 | 5/1992 | Umehara et al. | 425/200 |
| 5,225,137 | 7/1993 | Sadr | 264/349 |
| 5,236,655 | 8/1993 | de Soet | 264/320 |
| 5,417,904 | 5/1995 | Razi et al. | 264/129 |
| 5,489,200 | 2/1996 | McGraw et al. | 425/144 |

Primary Examiner—Mary Lynn Theisen
Attorney, Agent, or Firm—John E. Vandigriff

[57] ABSTRACT

The invention is to apparatus and method for a plasticizing batch process used in manufacturing building materials such as sheet goods, roofing shingles, and various sizes of dimensional lumber products. Recycled waste plastics and other not plastic materials are used in a batch process to plasticize the waste materials into a mixture used in molding various products. A intensive mixture mixes and plasticizes the waste materials of a predetermined weight until the plasticized mixture reaches a predetermine temperature. The material is then expelled to a material mover to dispense the plasticized material by weight to molds in which the plasticized material is pressed to form various products.

24 Claims, 5 Drawing Sheets

PROCESS FOR MAKING NON-EXTRUDED MOLDED BOARDS AND SHEET PRODUCTS

FIELD OF THE INVENTION

This invention relates to molded products, and more particularly to an apparatus and method for using a batch process to molded products made from recycled waste materials.

BACKGROUND OF THE INVENTION

Numerous wood products in use today, such as fence posts, railroad ties, and dimensional lumber are dependent upon diminishing forest reserves as a source of material. For numerous applications, wood products are especially vulnerable to rot and decay from excessive exposure to moisture, insects, dry-rot and other conditions that cause deterioration to the product. Wood products must be coated with preservatives of various types when they are to be exposed to the environment. For example, railroad ties and fence posts have long been treated with creosote under pressure to protect the wood from moisture and boring insects. Special treatments and application of protective coatings of paints and oil add appreciably to the cost of wood materials, and none are known to offer indefinite protection. The use of petroleum based preservatives tend to add some pollution to the environment.

Products have been made utilizing waste materials such as old automobile tires, waste plastics, and resinous thermoplastic materials. Products made from these materials are made utilizing heat and pressure to extrude products. Examples of such processes are defined in U.S. Pat. Nos. 4,028,288 and 4,191,522. The heat and extrusion process usually involves temperature in excess of 450 degrees Fahrenheit. This presents problems when the waste products include polyvinyl Chloride (PVC). PVC materials are volatile, explode, and produce gases when exposed to heat at elevated temperatures. Even small amounts of PVC, as small as one percent, can be disastrous. Since it is difficult to separate PVC materials from waste recycled materials, extruding products from recycled material is not desirable.

SUMMARY OF THE INVENTION

The invention is to an apparatus and a batch processing method for molding plastic products useful in replacing wood products. A plasticizing batch process is used for manufacturing boards, sheet goods, roofing shingles and other building and structural products. The plasticizing process is effective with almost unlimited range of dirty thermoplastic material, including pieces of plastic waste and a mixture thereof, with such non-thermoplastic bits of crumbled vehicle tires and celluloid fiber bits, and including filler material such as saw dust and paper particles. The materials are combined by means of rapid intensive mixing under moderate pressure so that shear heat is generated to a level causing continuous fusing in a batch mix until a desired preset temperature is reached. Then the entire batch is expelled from the mixing chamber to a hot melt mover which distributes the melted material to flat molds by exact weight. Pressure is applied to the material in the molds to form the material into the mold pattern. Since the temperature of the mixture is limited, there is no problem with mixtures that include PVC materials.

The technical advance represented by the invention, as well as the objects thereof, will become apparent from the following description of a preferred embodiment of the invention when considered in conjunction with the accompanying drawings, and the novel features set forth in the appended claims.

DESCRIPTION OF A PREFERRED EMBODIMENT

Figure 1:
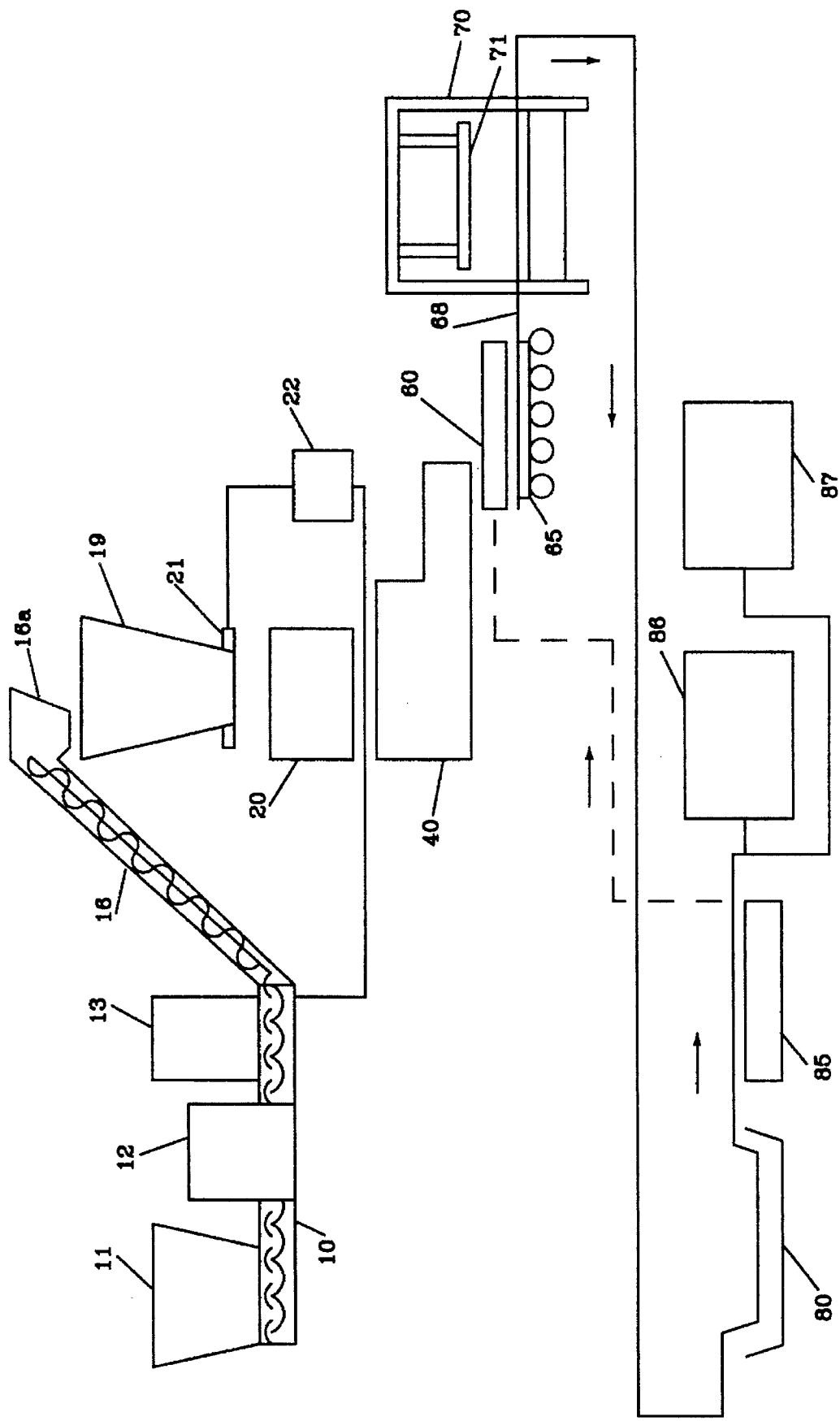
FIG. 1 illustrates an example of a production line for making non-extruded molded products using a plasticizing batch process.

FIG. 1 shows an example of a production line that utilizes a plasticizing batch process for manufacturing boards, sheet goods, roofing shingles and other building and structural products. The plasticizing process is effective with almost unlimited range of dirty thermoplastic material, including pieces of plastic waste and a mixture thereof, with such non-thermoplastic bits of crumbled vehicle tires and celluloid fiber bits, and including filler material such as saw dust and paper particles.

The production line has a conveyor 10 that receives raw material from dump container 11. Conveyor 10 moves the raw material through a particle reducer 12 that cuts and grinds the raw material into small particles. The raw material is then passed through a separator 13 that removes particles of metal from the mixture of raw material. Both magnetic and eddy current separators are used to insure that both ferrous and non-ferrous metals are removed from the mixture. After metal particles are removed from the material mixture, it is conveyed up a material conveyor 16 through hopper 16a to a load hopper 19 positioned over an intensive mixer 20 into which a measured amount, by weight, of the material mixture is placed. Material is fed into mixer 20 after the desired weight of material is placed in hopper 19.

Hopper 19 is mounted on a scale 21 used to measure the quantity of material fed into hopper 19. A mixture of up to 450 pounds of material is placed in mixer 20 and intensively mixed, as explained below with reference to FIG. 2. A control unit 22 monitors the weight from scale 21 and stops conveyor 16 when the desired amount of material, for example 450 lbs., has been placed in hopper 19, and releases the material to mixer 20. Thereafter the mixture is plasticized in mixer 20, it is moved to a hot melt mover 40 for moving the plasticizied material into molds 60. The plasticized material is placed into molds 60 by weight, dependent upon the size of the mold and product being produced. Each mold 60 as it is being filled, is on a weight table 65. Molds 60 are moved by conveyor 68 from weight table 65 to press 70 which presses the plasticized material firmly into each mold 60 by press platen 71 to ensure that there are no voids or air bubbles in the molded product.

After the plasticized material has been pressed into the mold 60, mold 60 is passed though a water bath 80 to cool down the molded product before it is further processed. The molded product is then ejected from mold 60 at ejector station 85. The molded product is then sawed into products (86) such as posts, roofing shingles, dimensioned lumber and sheet building boards. To provide large products, various molded products may be welded (87) together by welding fusing one or more products together by such methods as laser welding and other heat fusing processes.

Figure 2:
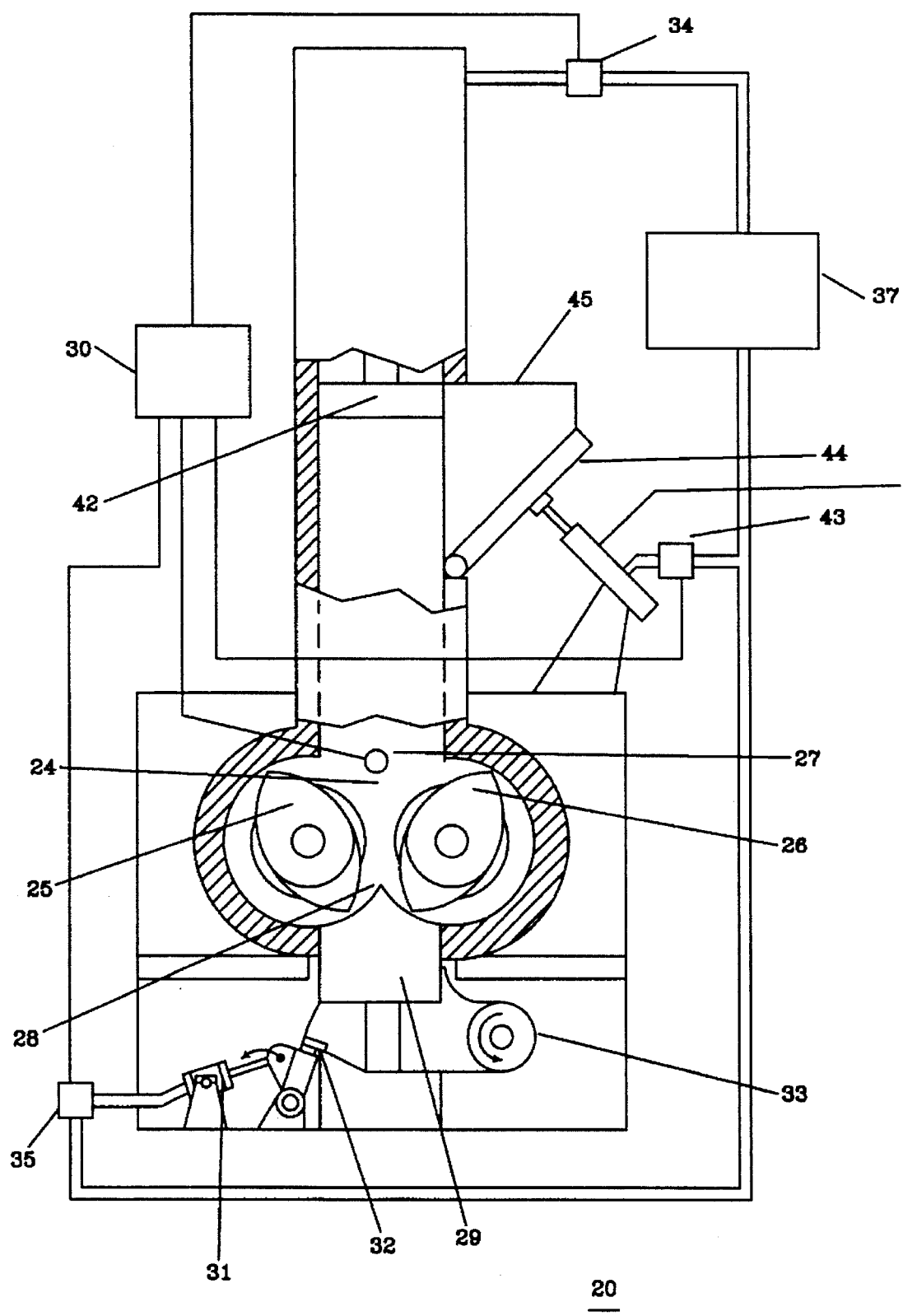
FIG. 2 illustrates an example of an apparatus utilized in a production line for plasticizing material used in the batch process.

FIG. 2 shows an intensive mixer 20, utilized in the production line of FIG. 1, for plasticizing the mold material. Mixer 20 includes a chamber 24 into which the material to plasticized is placed through hopper 45, and two rotating mixing rotors 25 and 26 which, during rotation, mixes and homogenizes the material to a plasticized state. During mixing, pressure is applied by piston 42 to the material to hold it in chamber 24, and to ensure it is sufficiently held in contact with the mixing rotors 25 and 26.

The mix, when being plasticized, produces heat which helps in the plasticizing process. Thermocouple 27 monitors the resultant heat and, when the heat reaches a temperature of about 450 degrees F., the plasticized mixture is removed from mixer 20 through a material passage 28, closed by a hinged door 29 during mixing. Upon the thermocouple 27 sensing the mixture reaching a temperature of about 450 degrees F., controller 30, connected to thermocouple 27, causes hinged door 29 to be opened by actuating cylinder 31, through air valve 35 which rotates latch 32 from under door 29, allowing door 29 to rotate about pivot hinge 33, opening material passage 28 allowing the plasticized mixture to drop into hot melt mover 40.

Controller 30 is also connected to air valves 34 and 43. Air valve 34, actuated by air from air source 37, causes piston 42 to move downward, to apply pressure to the material mix. Air valve 43 causes door 44 of hopper 45 to open to allow material mix to enter from hopper 19, and closes door 44 after the material is in mixer 20.

Figure 3:
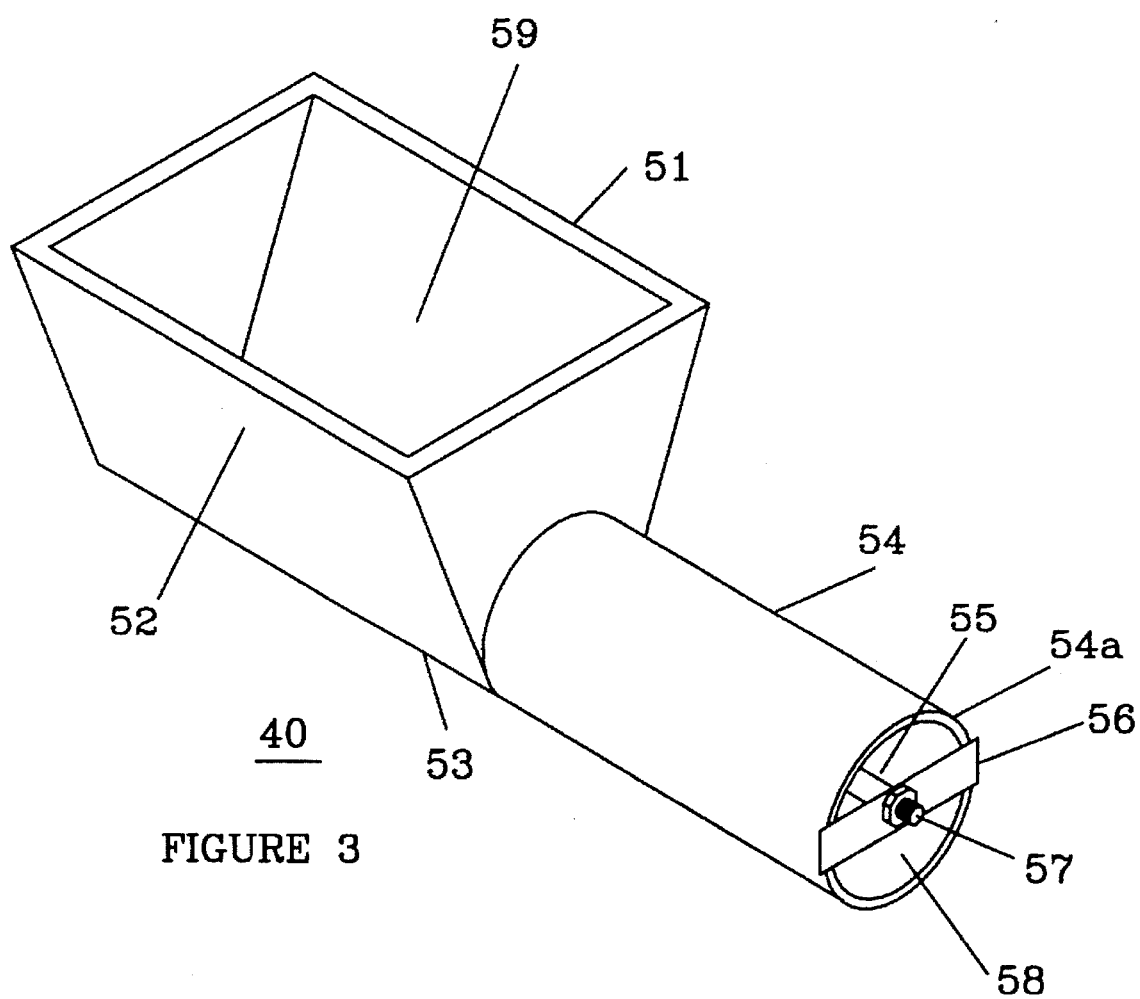
FIG. 3 is an example of a hot melt mover for moving the plasticizied material into molds.

FIG. 3 is an example of a hot melt mover 40 for moving the plasticizied material into molds. Mover 40 has two sloped sides 51 and 52 which slope to bottom 53 which is semicircular. A cylindrical tube 54 extends from one end of mover 40. A rotating screw conveyor 55 (FIG. 4) is attached to a support bar 56 at open end 54a. When hot plasticized material is dropped from mixer 20 into the open top 59 of mover 40, it is moved by conveyor 55 to opening 58 to place the plasticized material into a mold.

Figure 4:
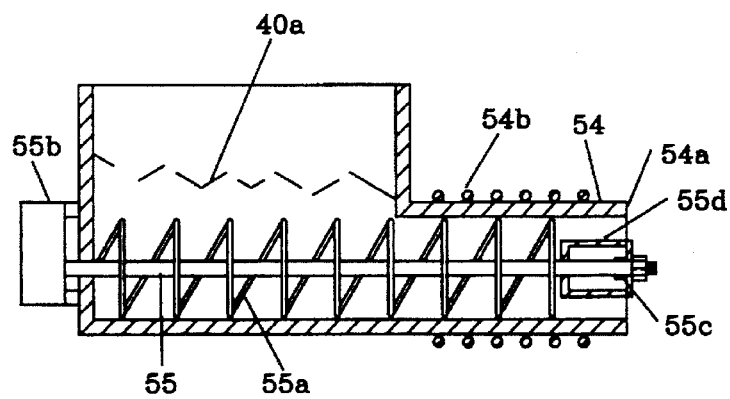

FIG. 4 is a partial cross-sectional side view of mover 40 showing conveyor 55 having blades 55a which move the plasticized material 40a through mover 40 to the opening 58. A motor 55b turns conveyor 55. Conveyor 55 is mounted in a bearing 55c on end 54a. Bearing 55c is covered by a covering 55d to keep the plasticized material away from bearing 55c. A heating element 54b may be positioned around cylindrical end 54, or may be in the form of heater strips (not illustrated) along side walls 51 and 52. The heater elements keep the plasticized material in a molten plasticized state so that it is easily moved into molds and pressed in the molds.

Figure 5:
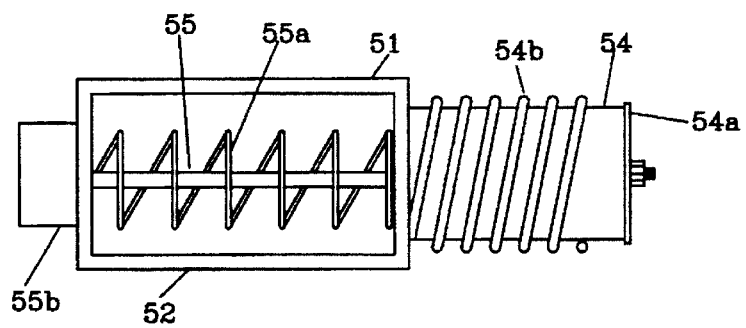
FIGS. 4, 5 and 6 are side, top and end views, respectively, of the hot melt mover of FIG. 3.
Figure 6:
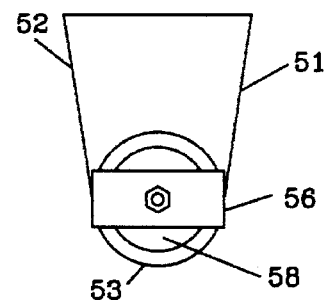

FIGS. 5 and 6 are top and end views, respectively, of mover 40 showing conveyor 55 with blades 55a and the heater elements 54a on end 54.

Figure 7:
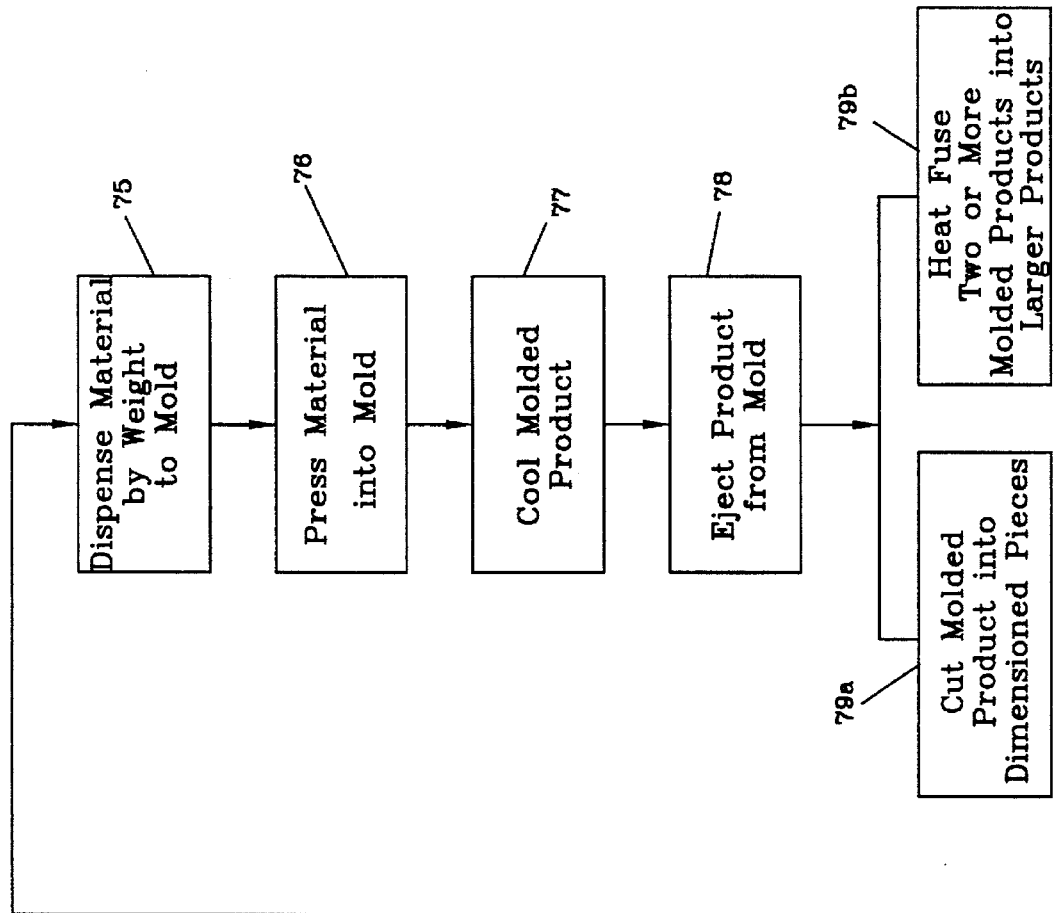
FIG. 7 is a flow diagram showing the various steps of making molded products in a batch process utilizing plasticized recycled waste materials.

FIG. 7 is a flow diagram showing the various steps of making molded products in a batch process utilizing plasticized recycled waste materials. The waste material, which may include old automobile tires, waste plastics, resinous thermoplastic materials, along with small amounts of materials such as saw dust and paper particles, are cut into small particles and metal part are removed (step 70). Any dirt and other such contaminants do not have to be removed from the waste materials. The small particles are then dispensed by weight (step 71) into an intensive mixer and plasticized (step 72) by a process of intensive mixing where the friction of the waste material against itself, two rotors and the mixing chamber produces sufficient heat to plasticize and homogenize the waste material into a molten state. A control unit 30 and thermocouple 27 (FIG. 2) monitors the heat in the mixing chamber. When the temperature of the plasticized material mixture reaches predetermined temperature, for example 450° F., the plasticized material is automatically dumped (step 73) from the mixing chamber into a dispensing hot melt apparatus (step 74) that moves the hot plasticized material into a mold by weight (step 75). The plasticized material in the mold is then pressed into the mold by a press patten (step 76) to ensure that the molded product is properly formed, and to remove voids and air bubbles from the molded product. From the press patten, the mold is moved through a cooling bath (step 77) to partially cool the molded product.

Next the molded product is ejected from the mold (step 78). At this point there are several optional steps that may be performed on the molded product. In some instances the product is complete as molded. In other instances, the molded product may be cut into various sizes to create dimensioned products such as dimensional lumber products (step 79a). In still other instances, two or more molded products may be heat fused together (step 79b) to make larger products.

What is claimed:

1. A production line for batch processing recycled waste materials to produce molded products, comprising:

apparatus for preparing recycled waste materials;

an intensive mixer, operating below a temperature of 450° F., for plasticizing the recycled waste materials;

a material mover for moving the plasticized recycled waste materials to a mold; and a press to press the plasticized recycled waste materials into the mold to conform to the shape of the mold to produce a molded product.

2. The production line according to claim 1, wherein said apparatus for preparing recycled waste materials includes apparatus for cutting the waste materials in small particles and a separator for removing metals from the recycled waste materials.

3. The production line according to claim 1, including a water bath station for cooling said mold and molded material prior to ejecting the molded product from the mold.

4. The production line according to claim 1, including a welding station to fuse one or more of the molded products together to produce products of various lengths and sizes.

5. The production line according to claim 4, including a saw station to saw the molded products into products of various sizes.

6. The production line according to claim 1, wherein said material mover has a screw type conveyor to move the plasticized material through said mover to said molds.

7. The production line according to claim 1, wherein said material mover is heated to maintain the plasticized material in a molten state as it is moved into a mold.

8. The production line according to claim 1, wherein said mixer includes a weighing station to determine and limit the amount of material placed in the intensive mixer for each batch of material to be plasticized at one time.

9. The production line according to claim 1, wherein said intensive mixer includes a thermocouple and a control circuit to limit the temperature of the plasticized material to a temperature not to exceed 450° F.

10. An intensive mixer for plasticizing recycled waste materials, comprising:

a mixing chamber for receiving recycled waste materials, a pair of rotors in the mixing chamber for plasticizing and homogenizing the recycled waste materials by friction and shearing action of the materials against the rotors and mixing chamber walls;

a piston for pressing said recycled waste materials firmly into said mixing chamber; and a opening in the bottom of said mixing chamber, and a door closing said opening, through which said plasticized material is removed from said mixing chamber when said materials have been plasticized.

11. The mixing chamber according to claim 10, including a control circuit and a thermocouple in said mixing chamber, wherein said thermocouple and control circuit monitor the temperature of the plasticized material in the mixing chamber and cause the plasticized material to be removed from the mixing chamber when the temperature sensed by the thermocouple reaches a predetermined temperature.

12. The mixing chamber according to claim 10, in combination with a weighting station to determine the weight of the material introduced into the mixing chamber.

13. The mixing chamber according to claim 10, wherein said two rotors are turning at different speeds.

14. The mixing chamber according to claim 10, including a press platen for moving and holding the material in the mixing chamber against the rotors.

15. A non-extruding material mover for receiving a plasticized mixture of recycled waste materials, comprising:

a receiving hopper having a first compartment with sloped sides extending to a semicircular bottom for receiving the plasticized mixture, and a dispensing outlet for dispensing the plastcized material in a single mass;

a conveyor for moving the materials to the outlet end; and a heater adjacent the dispensing outlet for maintaining the materials in a molten state during dispensing.

16. The material mover according to claim 15, wherein said conveyor is a screw type conveyor to move the material from the hopper through the dispensing end.

17. The material mover according to claim 15, wherein said mover has a cylindrical extension to the receiving hopper through which the material is moved from the receiving hopper to the dispensing end, and around which the heater is mounted.

18. A non-extrusion method for producing molded produces from plasticized recycled waste materials in batch process; comprising the steps of:

preparing the recycled waste materials for plasticizing:

plasticizing, in the form of a single mass, a predetermined amount of recycled waste materials in an intensive mixer;

removing the single mass of plasticized recycled waste materials from the intensive mixer to a material mover;

moving the plasticized recycled waste materials through the material mover and dispensing a predetermined amount of the plasticized recycled waste materials into a mold.

19. The method according to claim 18, including the step of pressing the plasticized recycled waste material into the mold with a press platen to form a molded product.

20. The method according to claim 18, including the steps of moving the mold through a water bath to cool the molded product, and then ejecting the molded product from the mold.

21. The method according to claim 18, including the step of sawing the molded product to produce products of various sizes.

22. The method according to claim 18, including the step of heat fusing at least two molded products together to form larger products.

23. The method according to claim 18, wherein in the preparing step the recycled waste materials are cut into small pieces and metal particles are removed prior to plasticizing the recycled waste materials.

24. The method according to claim 18, wherein the plasticized recycled waste material is placed in the mold by weight.

* * * * *